Aug. 31, 1937.   M. MALLORY   2,091,412
INTERNAL COMBUSTION ENGINE
Filed July 7, 1936
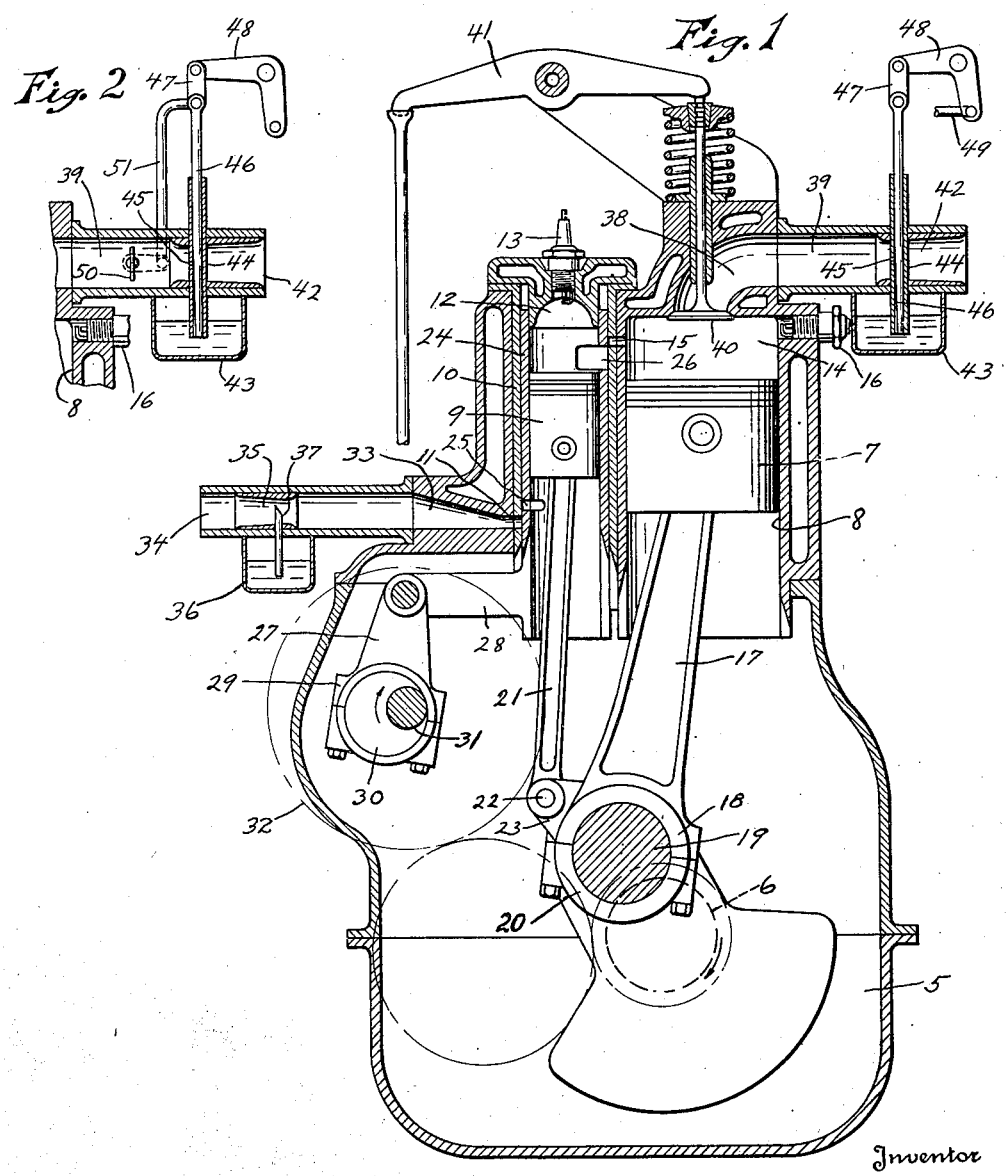
Inventor
Marion Mallory,
By E. N. Lovewell
Attorney Patented Aug. 31, 1937

2,091,412

UNITED STATES PATENT OFFICE 2,091,412

INTERNAL COMBUSTION ENGINE

Marion Mallory, Detroit, Mich.

Application July 7, 1936, Serial No. 89,441

11 Claims. (Cl. 123—143)

This invention relates to internal combustion engines of the constant compression type in which each power unit comprises a cylinder small enough in size to develop only enough power for idling when receiving substantially a full charge of air and fuel of proper proportions to be electrically ignited, and a second cylinder connected to the same crankshaft as the small cylinder (large enough in size to develop greater power), adapted to receive a charge of air in which fuel is admitted to it to increase the power, the charge in the larger cylinder being usually ignited as a result of the electrically ignited explosion in the smaller cylinder.

In the present construction, a charge suitable for idling is supplied to the small cylinder from a carburetor which has no valve. A charge of air for the larger cylinder is supplied through a venturi which has an air inlet with no valve, a metered charge of fuel being added thereto, when needed. Valve means are provided for opening the inlet ports to the two cylinders and also a port between the two cylinders at predetermined times.

Generally speaking, the operation of the throttle neither increases nor diminishes the volume which flows into the cylinders, and the engine may properly be termed as a constant charged and a constant compression engine. In the event that it is desired to have smoother performance at idle or at light loads than can possibly be had from full compression, a valve may be added, to be operated in synchronism with the throttle, to slightly reduce the air flow at idle and light load conditions. The engine would then operate as a semi-constant compression engine, because the valve never completely shuts off the air. It only reduces the charge enough to smooth out the performance.

The object of the present invention is to improve the operation of engines of the type stated, and it differs from previous constructions in the formation and control of the fuel mixture supplied to the small cylinder or primary combustion chamber, its subsequent ignition and the propagation of the flame therefrom into the large cylinder or secondary combustion chamber.

The salient features of the invention and the advantages thereof will be more specifically explained in connection with the accompanying drawing, in which,—

Fig. 1 is a vertical sectional view taken through one of the power units of the engine and the means for charging the same, the compression stroke being nearly completed.

Fig. 2 shows a similar view of a modified form of charging means for the large cylinder.

As shown in the drawing, the engine to which the invention pertains comprises a crank case 5, within which a crank shaft 6 is mounted. Each power unit comprises a comparatively large piston 7, reciprocable in the cylinder 8, and a smaller piston 9, reciprocable in the cylinder 10. The cylinder 10 has a fuel mixture inlet port 11 near its lower end and at its upper end there is a primary combustion chamber 12, in which there is a spark plug 13. At the upper end of the cylinder 8, there is a secondary combustion chamber 14, into which the flame is propagated from the chamber 12 through a port 15. The chamber 13 may also be provided with a spark plug 16, in case dual ignition is desired. The engine may have any number of these power units, corresponding to the number of cylinders in a conventional engine, but since these units are all alike, it has been deemed necessary to show only one.

The larger piston 7 has a connecting rod 17 formed with a bearing member 18 on the crank pin 19 of the shaft 6. This bearing member has a cap 20 secured by bolts or the like. The smaller piston 9 has a connecting rod 21 connected to a pin 22 mounted in an extension 23 of the bearing member 18.

The pistons 7 and 9 are shown in Fig. 1 as they are nearing the end of the compression stroke. At this time, both of the ports 11 and 15 are closed by a sleeve valve 24, which encircles the piston 9 within the cylinder 10. This valve, however, has a port 25, which is adapted to uncover the port 11 during the latter part of the intake stroke, and a port 26 which is adapted to cover the port 15 as the engine continues its operation from the position shown in Fig. 1.

The valve 24 is controlled through a connecting rod 27, which is connected at its upper end to a lug 28 formed on the valve and, at its other end, has a bearing 29 on an eccentric 30 formed on the cam shaft 31, the latter being driven from the crank shaft 6, at half the speed of said shaft, by gearing shown diagrammatically at 32.

Fuel mixture is supplied to the intake port 11 from a manifold 33. An air inlet 34 leads through a venturi 35 to the manifold 33 and a small carburetor 36 supplies fuel thereto through a jet opening 37 located in the venturi.

When the port 25 in the sleeve valve 24 registers with the port 11, the piston 9 has passed the port 25 upon the intake stroke, the port 15 is closed and there is a high vacuum in the cylinder 10.

It is to be noted that the carburetor 36, the air inlet 34 and the mixture passageway therefrom have no valve, but are so designed that an easily ignited mixture of proper volume and proportions for idling is delivered to the cylinder 10. The timing of this charge, as effected by the operation of the eccentric 30 and the position of the port 11, is of the utmost importance, because this cylinder is so small that the velocity through the carburetor would be slow if the carburetor were connected to an intake valve that started to open when the piston started downwardly on its stroke. This slow velocity would fail to atomize the mixture to a point that would produce satisfactory idling. In the construction shown, a high vacuum is created and stored in the cylinder 10 during the downward stroke, and, when port 25 registers with port 11, there will be a high velocity of the inflowing air and fuel from the nozzle 37. The fuel is, therefore, completely atomized. Also, the volume of the charge and the proportions of the mixture are substantially uniform, regardless of the speed of operation.

The main power charge is delivered to the large cylinder 8 through the port 38 from the intake manifold 39. The inlet valve 40 is controlled in the usual manner from the cam shaft through the rocker arm 41. It will be also understood that the exhaust from the cylinder 8 is effected in the usual manner. The cylinder 10 is exhausted through the cylinder 8.

Air is supplied to the manifold 39 through a venturi 42. A carburetor 43, located beneath the venturi 42 has an outlet tube 44 with an opening 45 into the venturi. The fuel supplied through the opening 45 into the air stream is metered by a tapered pin 46, which is slidable in the tube 44 and is connected by a link 47 and bell crank 48 to the throttle rod 49.

The small cylinder 10 develops just enough power for idling. For idling, therefore, the metering pin 46 is in its lowermost position and air alone is admitted to the cylinder 8. When more power is wanted, the metering pin is raised, admitting a progressively increasing proportion of fuel to the air stream passing through the venturi 42.

With the construction shown in Fig. 1, the cylinder 8, as well as the cylinder 10, operates under substantially constant compression. The passageway leading to the port 38 has no air valve and no throttle valve, other than the metering pin 46. Raising the metering pin serves to increase the proportion of fuel in the mixture but does not change the volume of the charge.

In case the operation of the engine is rough when idling or operating under light loads, due to the high compression, a valve 50 may be used in the intake passageway, as shown in Fig. 2. This valve is connected by a link 51 to the upper end of the metering pin 46, so that when the metering pin is lowered to shut off the fuel, the valve is closed, and vice versa. It will be noted that the valve can only partly close the intake passageway, so that it only cuts off a part of the air when the engine is idling.

In the operation of the engine, both ports 11 and 15 are closed by the valve 24, as stated above, during the greater part of the intake stroke. As the piston 9 approaches the lower end of its cylinder on the intake stroke, the valve 24 also approaches its lowermost position. This opens the port 11, while the port 15 remains closed, and the high vacuum in the cylinder 10 quickly draws in a predetermined completely atomized charge for idling, which is of fixed proportions and volume. In the meantime, the cam shaft has caused the rocker arm 41 to open the valve 40 and a charge of air or mixture, depending upon the position of the metering pin 46, has been drawn into the cylinder 8.

During the compression stroke, as the pistons reach the position shown in Fig. 1, the valve 24, in response to the half-speed rotation of the eccentric 30, is about to open the port 15 between the two cylinders. It will be noted that the small piston 9 leads the large piston 7, so that the compression in the chamber 12 at this time is appreciably greater than in the chamber 14. As soon as the port 15 starts to open, therefore, the highly compressed mixture in the small cylinder begins to rush through the port into the large cylinder. This takes place when the compression in the small cylinder is near its maximum and before the compression in the large cylinder has reached its maximum. This creates a high turbulence which extends to and around the spark plug 13, rendering the mixture more easily ignited. It will be understood that the spark occurs while turbulence is taking place.

The sleeve valve 24 is so timed and the port 26 is so disposed that the port 15 is open during the remainder of the compression stroke and during all of the power and exhaust strokes. The mixture from the small cylinder is surging into the large cylinder at the time it is ignited. This promotes flame propagation into the large cylinder. Low grade fuel may, therefore, be used for the large cylinder with the assurance that it will be thoroughly ignited.

In fact, the high vacuum in the small cylinder at the time the port 11 is opened, with the resultant complete atomization of the fuel, and the high turbulence at the time the spark occurs, make it possible also to use low grade fuel in the small cylinder with very good results.

Due to the timing of the port 15 and port 11 by the sleeve valve, it can be seen that there will be no mixture passing from the large cylinder to the small one, because the communication between the two cylinders is closed on the intake strokes of obth pistons and it is opened at a time when the pressure is higher in the small cylinder than it is in the large one. There will be a surge from the small cylinder to the large one, and, by the time the large piston reaches its top center, the explosion will have taken place.

It is to be understood that the details of construction herein shown and described are merely illustrative and that the invention also embraces all such modifications as may be made within the scope of the appended claims.

Having thus described the invention, what I claim as new and desire to secure by Letters Patent, is:—

1. A four cycle internal combustion engine comprising two cylinders, one larger than the other, pistons reciprocable in the respective cylinders, means including a carburetor for supplying a fixed idling charge to the small cylinder, means for admitting said idling charge to the small cylinder only when the piston therein is near the end of its intake stroke, means including a second carburetor for supplying a mixture of variable proportions to the large cylinder, means for developing a greater compression in the small cylinder than in the larger one and then opening communication between the two cylinders, and means for igniting the charge in the small cylinder and exploding it into the large cylinder while there is a surge from the small cylinder into the larger one as a result of the opening of the communication between them.

2. A four cycle internal combustion engine comprising two cylinders, one larger than the other, pistons reciprocable in the respective cylinders with the small piston leading the large one, a carburetor and venturi sufficient to supply only an idling charge to the small cylinder, means for admitting such idling charge to the small cylinder, only when the piston therein is near the end of its intake stroke, means for opening communication between the two cylinders while the pressure in the small cylinder exceeds that in the large cylinder toward the end of the compression stroke, and means for igniting the charge in the small cylinder while the mixture therein is in a turbulent state resulting from the opening of said communication.

3. A four cycle internal combustion engine comprising two cylinders, one larger than the other, pistons reciprocable in the respective cylinders with the small piston leading the large one, means for supplying a charge of fixed volume and proportions to the small cylinder, means for opening communication between the two cylinders while the pressure in the small cylinder exceeds that in the large cylinder toward the end of the compression stroke, said communication remaining open until the end of the exhaust stroke, and means for igniting the charge in the small cylinder while the mixture therein is in a turbulent state resulting from the opening of said communication.

4. A four cycle internal combustion engine comprising two cylinders, one larger than the other, pistons reciprocable in the respective cylinders, a fuel mixture passageway with unvarying fuel and air flow capacity suitable to supply an idling charge to the small cylinder, an independent mixture passageway leading to the large cylinder and having an air inlet and variable fuel inlet, means for admitting said idling charge to the small cylinder only when the piston therein is near the end of its intake stroke, the small piston being operable to create a greater compression in its cylinder toward the end of its compression stroke than exists at that time in the larger cylinder, means for opening communication between the two cylinders while such pressure conditions exist, igniting the charge in the small cylinder and exploding it into the large cylinder.

5. A four cycle internal combustion engine comprising two cylinders, one larger than the other, pistons reciprocable in the respective cylinders with the small piston leading the large one, a fuel mixture passageway with unvarying fuel and air flow capacity suitable to supply an idling charge to the small cylinder, an independent mixture passageway leading to the large cylinder and having an air inlet and a variable fuel inlet, means for admitting said idling charge to the small cylinder only when the piston therein is near the end of its intake stroke, means for opening communication between the two cylinders while the pressure in the small cylinder exceeds that in the large cylinder toward the end of the compression stroke, said communication remaining open until the end of the exhaust stroke, and means for igniting the charge in the small cylinder while the mixture therein is in a turbulent state resulting from the opening of said communication.

6. A four cycle internal combustion engine comprising two cylinders, one larger than the other, pistons reciprocable in the respective cylinders, means including a valveless carburetor and a valveless passageway to supply a charge to the small cylinder suitable for idling, an independent mixture passageway leading to the large cylinder and having a constant flow air inlet and variable fuel inlet, means for admitting said idling charge to the small cylinder only when the piston therein is near the end of its intake stroke, and means for igniting the charge in the small cylinder and exploding it into the large cylinder.

7. A four cycle internal combustion engine comprising two cylinders, one larger than the other, pistons reciprocable in the respective cylinders with the small piston leading the large one, means including a valveless carburetor and a valveless passageway to supply a charge to the small cylinder suitable for idling, an independent mixture passageway leading to the large cylinder and having a constant flow air inlet and variable fuel inlet, means for admitting said idling charge to the small cylinder only when the piston therein is near the end of its intake stroke, means for opening communication between the two cylinders while the compression in the small cylinder exceeds that in the large cylinder toward the end of the compression stroke, said communication remaining open until the end of the exhaust stroke, and means for igniting the charge in the small cylinder while the mixture therein is in a turbulent state resulting from the opening of said communication.

8. A four cycle internal combustion engine comprising two cylinders, one larger than the other, pistons reciprocable in the respective cylinders with the small piston leading the large one, means to supply a fixed idling charge to the small cylinder, other means to supply a charge to the large cylinder, including a passageway with a fuel inlet and a metering pin constituting the sole means for varying the power of the engine, means for admitting said idling charge to the small cylinder only when the piston therein is near the end of its intake stroke, means for opening communication between the two cylinders while the compression in the small cylinder exceeds that in the large cylinder toward the end of the compression stroke, said communication remaining open until the end of the exhaust stroke, and means for igniting the charge in the small cylinder while it is in a turbulent state following the opening of such communication between the two cylinders.

9. A four cycle internal combustion engine comprising two cylinders, one larger than the other, with a port connecting their upper ends, pistons reciprocable in the respective cylinders with the small piston leading the large one, means to supply charges to the two cylinders from two separate sources, a sleeve valve disposed about the small piston within its cylinder, means to operate said sleeve valve to admit the charge to the small cylinder as the piston therein nears the end of its intake stroke and to close said communicating port from the beginning of the intake stroke until the small piston is near the end of its compression stroke, and means for igniting the charge in the small cylinder directly after communication is established between the two cylinders and while the charge in the small cylinder is in a turbulent state as a result thereof.

10. A four cycle internal combustion engine comprising two cylinders, one larger than the other, pistons reciprocable in the respective cylinders with the small piston leading the large one, means for supplying a charge of fixed volume and proportions to the small cylinder for idling, an independent air passageway leading to the large cylinder, means for optionally admitting a metered charge of fuel to said passageway, and a valve on the engine side of said last mentioned means and capable only of partially closing said passageway when little or no fuel is being admitted to the air stream passing therethrough.

11. A four cycle internal combustion engine comprising two cylinders, one larger than the other, pistons reciprocable in the respective cylinders with the small piston leading the large one, means for supplying a charge of fixed volume and proportions to the small cylinder sufficient only for idling, a passageway leading to the large cylinder and having a venturi with an unobstructed air inlet, a fuel nozzle opening into said venturi, a metering pin operable to close said nozzle or to progressively open it, and a valve in said passageway operable in synchronism with the metering pin to shut off only a part of the air flow through said passageway when the nozzle is closed and to leave said passageway substantially unobstructed when the nozzle is open.

MARION MALLORY.